Feb. 11, 1969  D. L. BOWERS  3,426,748

STIMULATOR ANALYZER AND LOCATOR

Filed Nov. 23, 1965  Sheet 1 of 4

INVENTOR.
DAVID L. BOWERS
BY
Ralph G. Hohenfeldt
ATTORNEY

INVENTOR.
DAVID L. BOWERS
BY
Ralph G. Hohenfeldt
ATTORNEY

United States Patent Office 3,426,748
Patented Feb. 11, 1969

3,426,748
STIMULATOR ANALYZER AND LOCATOR
David L. Bowers, Milwaukee, Wis., assignor to General Electric Company, a corporation of New York
Filed Nov. 23, 1965, Ser. No. 509,390
U.S. Cl. 128—2.06
Int. Cl. A61b 5/04; H03k 3/26; G01r 19/16
9 Claims

ABSTRACT OF THE DISCLOSURE

The minimum electric pulse energy required for stimulating the heart with an implanted stimulator, is determined with an external analyzer that indicates the threshold energy for stimulation as a percentage of the energy that is available from the stimulator. The pacing pulses from the stimulator are coupled to the heart through a capacitor. The analyzer induces the capacitor to charge quickly and stimulate the heart with a pacing pulse. It then induces a controlled series of small high rate pulses which maintain the charge on the capacitor so it discharges only patrially between pacing pulses. Since the capacitor remains partially charged, the charging current of the capacitor can be progressively reduced until it is insufficient to stimulate the heart. The ratio of the number of high rate pulses to the total number of such pulses that can be induced between pacing pulses represents the energy needed to stimulate the heat as compared with the energy that is available from the stimulator.

---

This invention concerns a device and a method for assessing from outside a living body both the condition of a totally implanted electronic organ stimulator and the threshold electric energy or minimum energy that is necessary to stimulate a particular organ. For convenience, the device will hereinafter be called a threshold analyzer and the construction and use of a preferred embodiment of the invention will be given in relation to assessing myocardial threshold in a patient who has an implanted artificial cardiac stimulator.

Electronic cardiac stimulators are used in the treatment of heart block. In a patient who has this ailment, the natural periodic electric signals are generated on the atrium of the heart, but because of a conduction block, the signals do not reach the ventricle. Thus, the ventricle does not contract subsequent to and in synchronism with the atrium as it should, but instead it pumps at its own intrinsic rate which is below the rate of the atrium, and may be as low as twenty to thirty strokes per mintue. A concomitant of this phenomenon is ventricular blood output deficiency that causes the patient to exhibit subnormal vitality and may result in death if it persists without treatment.

In the fairly recent past, cardiologists have begun to manage heart block cases with prosthetic devices such as totally implanted artificial electronic stimulators. These devices generate electric pulses at a rate which approximates the required ventricular contraction rate for normal physiological activity. The artificial stimulator is connected to the myocardium with flexible insulated leads. The heart is thereby electrically stimulated to beat once for each pulse that is received.

In general, the electrical impedance that is presented to the stimulator power supply by the myocardium is equivalent to a resistance of about 300 ohms in series with a forty-seven microfarad capacitance. A normally operating stimulator will supply a normally responsive heart having approximately the aforementioned impedance value with pulses that are energetic enough to exceed the threshold energy level with a margin of safety. However, in due course, the safety factor is certain to be reduced as a result of gradual voltage decrease of the batteries in the stimulator and in some cases as a result of significant threshold changes in the patient's heart. In some instances, threshold changes may be due to myocardial resistance increases, probably due to fibrosis of the tissue about the electrodes at the heart attachment, in which case the heart may not be stimulated even though the stimulator is capable of delivering pulses that would be normally of sufficient energy to stimulate the heart. This condition is called exit block and the term may be aptly applied to any situation where the pulse energy is sufficient to stimulate but the heart does not respond although the electrodes are intact.

From the remarks in the preceding paragraph, one may see that proper management of patients with implanted stimulators requires that the cardiologist have some way in which to derive information on how well the concealed stimulator is stimulating the heart and on the charge condition of its batteries. It is also valuable for the cardiologist to know whether the energy of the stimulating pulses is far in excess of that required to stimulate a particular patient with low threshold so that if an occasion arises for replacement of the unit, it may be replaced with a power supply of lower output energy. This would permit the batteries to be conserved and would extend the term for any subsequent replacements, which is most desirable for the patient.

An object of the present invention is to provide a device that will enable location and ascertaining the performance characteristics of an implanted stimulator from outside the body, without having direct mechanical access to the stimulator, and without harming the patient or resorting to surgical procedures unless impending failure of the stimulator is indicated. Achievement of the foregoing object and other more specific objects will appear from time to time throughout the course of the ensuing description of the invention.

It was stated earlier that a preferred embodiment of the invention would be described relative to an implanted artificial electronic stimulator, but it should be appreciated that the new stimulator analyzer is aplicable to stimulators for the bladder, carotid sinus, diaphragm, brain and other organs as well.

In general, the new stimulator analyzer may be used with any implanted stimulator that employs an electronic switch to control the cyclic charge and discharge of a capacitor that is connected or connectable with the equivalent capacitance and resistance which constitute the impedance of the organ being stimulated. During one cycle, current flow must be great enough to cause sufficient voltage drop across the organ to exceed its threshold level and effect its stimulation. Following this cycle, is a second one during which current flow is sufficiently small to prevent stimulation. The net current flow in the charging and discharging intervals is equal to zero, thereby providing biphasic operation which is important to reduce electrolytic action at the electrode attachment and minimize myocardial reaction due to D-C current flow.

In accordance with the invention, a series of high rate pulses are induced in the stimulator at a repetition rate that is greatly in excess of its intrinsic, basic pulse rate. These high rate pulses may be used to control either the charge or discharge level of the capacitor in which case the pace energy delivered to the organ can be regulated. Thus, increasing or decreasing the number of high rate pulses, depending on the design of the stimulator, until the organ stops functioning, and knowing the number of high rate pulses that can be delivered in the period between pacing pulses, or the change of pace pulse width $T_w$ at threshold compared with pulse width at normal pacing, will permit a determination of a ratio between the energy that is available from the stimulator and the minimum at energy threshold required to stimulate the organ.

A more detailed description of an illustrative embodiment of the invention will now be set forth in reference to the drawings in which.

Figure 1:
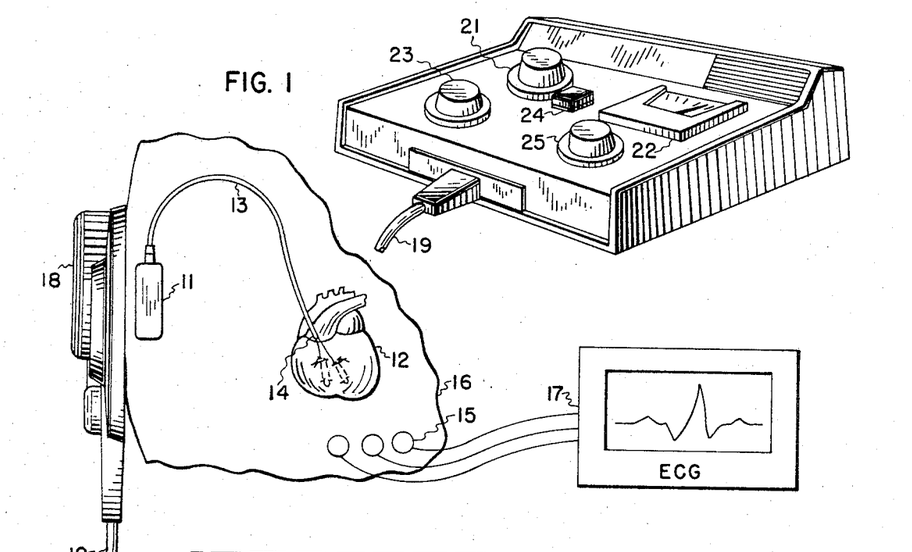
FIGURE 1 shows the new stimulator analyzer in conjunction with a patient on which it is being used, parts of the latter being schematized.

To lay a foundation for a later detailed discussion of the invention its general characteristics and use will first be described in connection with FIGURES 1 and 2. In FIGURE 1, the implanted cardiac stimulator whose performance is to be analyzed is designated generally by the reference numeral 11. This may be any of the well-known types of stimulators which produce pulses of rate and energy corresponding with the requirements for stimulating an organ such as a human heart 12. The stimulating pulses are delivered to the organ by a cable 13 which includes two insulated conductors whose bare ends 14 are sutured into the heart to serve as electrodes. During analysis, heart function may be monitored with a conventional electrocardiograph which receives heart signals from several electrodes 15 that are adhered to the body surface 16. The electrocardiograph bears the reference numeral 17, and for brevity, is marked ECG.

Essentially congruent with stimulator 11 outside of the body surface is an external coil assembly 18. As will be described in detail later, coil assembly 18 includes two concentric coils one of which has a ferrite core and the other an air core. The air core coil is powered by the analyzer for inducing electric pulses in stimulator 11. The ferrite core coil is for the purpose of having pulses induced in it in order to locate the stimulator before conducting a threshold analysis experiment. The external coil assembly 18 is connected by means of a cable 19 to the analyzer console 20. The analyzer has various control knobs, a "ready" light and meter which will now be described briefly.

Figure 6:
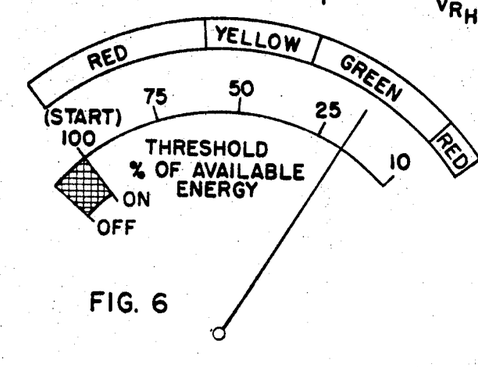
FIGURE 6 is an enlargement of the scales of a meter which is part of the analyzer.

With the analyzer turned on, a selector switch knob 21 is turned to a position marked "locate." The coil assembly 18 is then moved over the surface of the patient until an appropriate scale on a meter 22 indicates that maximum electromagnetic coupling has been achieved with a stimulator 11. This procedure is made possible by the fact that the stimulator emits weak electromagnetic radiation at a rate that corresponds with its intrinsic basic pulsing rate. One of the scales on the meter, associated with locating the pacemaker, is divided into red, yellow, green, and another small red section, as shown in the isolated view of the meter scales, FIGURE 6. When the coil position is such that there is a poor coupling between external coil 18 and stimulator 11, the needle of the meter will be in the large red zone. Fair coupling is indicated when the needle is in the yellow zone, and good coupling when the needle is in the green zone. It will appear later that analysis cannot proceed unless the needle indicates in the green zone because of an electrical interlock which makes attaining this condition mandatory before threshold analysis may be undertaken.

When the stimulator has been located accurately, a pace-rate control 23 on the console is set to whatever basic pace-rate is desired for the implanted stimulator 11. It will appear later that the pacing pulse rate can be altered by inducing external pulses, of slightly higher repetition rate than its intrinsic rate, into the pacemaker.

If "ready" light 24 is on as it should be after the coil assembly is properly located and the threshold control 25 is returned to the start position, the operator may proceed with the threshold measurement. This involves first to switch selector knob 21 to threshold position and with the operator switch SW3 depressed, to rotate the threshold control knob 25 gradually until high rate pulses discussed above reduce the energy of the pacing pulses sufficiently to drop the energy of the latter below the threshold level of the heart. This condition is manifested by a heart wave discontinuity on the oscilloscope face of the ECG monitor 17. Upon occurrence of a heart wave discontinuity, the scale on meter 22 is read in accordance with the setting of knob 25 and an operator switch (SW3) that is associated with coil assembly 18 is released so that after one, but no more than three beats, are missed the heart will be restored to being stimulated by the implanted stimulator 11.

Figure 3A:
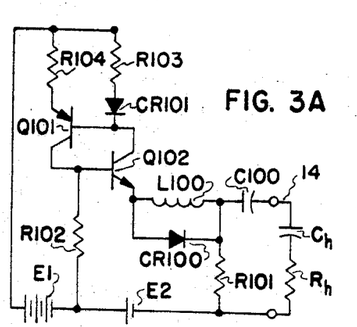
FIGURES 3A and 3B are circuit diagrams for two types of implantable cardiac stimulators in connection with which the invention may be used.
Figure 3B:
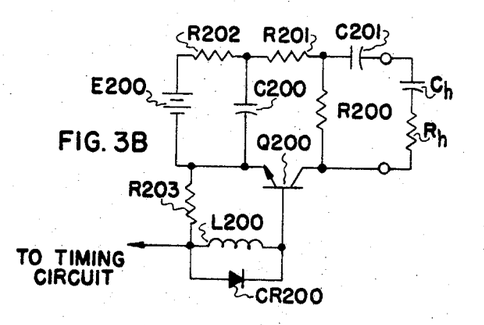

A schematic diagram of a typical implantable cardiac stimulator with which the new analyzer may be used is shown in FIGURE 3A. A more schematic or equivalent circuit diagram, of another type is shown in FIGURE 3B. The FIGURE 3A embodiment will be discussed next and the other type will be discussed later. It is to be understood that all of the electrical components of the stimulator, including the batteries, are imbedded in epoxy resin and covered with silicone rubber to make the assembly fluid-proof and compatible with the body. Only the heart attachment lead ends 14 are uninsulated and these are shown in FIGURE 3 as being connected to an organ whose impedance is represented by an equivalent capacitance of about forty-seven microfarads designated $C_h$, in series with a heart resistance $R_h$ of about 300 ohms. Included in the stimulator is a capacitor C100 which is smaller in magnitude than the capacitance of the heart $C_h$. During a stimulating interval, a high current flows for a few milliseconds through capacitor C100 with an accompanying comparatively large voltage drop across the heart impedance, which voltage stimulates the heart. After the stimulation period, capacitor C100 discharges through a comparatively high value resistor R101. The time constant of C100 and R101 is long so that the charge transfer rate during the discharge interval is insufficient to produce a voltage drop that would stimulate the heart. This discharge time constant provides the timing function for the switching circuit and also the discharge current is the reverse current flow through the heart, making for biphasic operation.

The oscillator which supplies pulses to the circuit just described, includes a NPN transistor Q102. The emitter-to-base circuit of transistor Q102 is normally biased in its conducting state by a battery E2 which is in series with the base-to-emitter path of Q102 through a circuit including base resistor R102, an inductance coil L100, and R101. Anytime the base-to-emitter circuit of Q102 is forward-biased in the amount of about 0.5 volt or more, transistor Q102 will conduct and charge capacitor C100. Inductance L100 is shunted by a diode CR100 to reduce voltage drop across the inductance during the charging interval and so that if the connections to the inductance open, there will still be a charging path for capacitor C100.

$E_1$ and $E_2$ in series produce about seven volts which supplies the charging current to capacitor C100 through the collector-to-emitter circuit of Q102, R103, and CR101. When Q102 starts to conduct, current flows from the positive side of $E_1$ through resistor R103, which is in series with a diode CR101 and the collector of Q102. R103 has a comparatively low resistance value and causes little voltage drop, but diode CR101 requires about 0.4 positive forward voltage to make it conduct. This small voltage drop makes the anode of CR101 positive and its cathode negative by that amount. This is equivalent to applying a positive 0.4 volt between the emitter and base of another transistor Q101. A limiting or feedback resistor R104 is included in the emitter circuit of Q101. With the small voltage that occurs across diode CR101 when Q102 begins conducting, there is an accompanying froward-bias of emitter circuit of transistor Q101 rendering it fully conductive spontaneously. When Q101 becomes conductive, current flows from batteries $E_1$ and $E_2$ through resistor R104, and then through the emitter-to-collector path of Q101 after which it flows from the base-to-emitter of Q102, placing Q102 into saturation. This heavy current flow through the collector-emitter of Q102 is the charging current for C100.

When capacitor C100 is fully charged, current through the path including R103, CR101, and transistor Q102 is greatly reduced. The drop in current flow through diode CR101 reduces its voltage drop. This removes the forward bias from transistor Q101 and turns it off. At the same time, some of the current which is diverted to bias resistor R102 is now discontinued in which case the R102 voltage drops quickly to cut-off Q102. Thus, the rise time of the pulse applied to the heart is short and cut-off is sharp. When C100 is charged, reverse bias voltage across R101 prevents Q102 from conducting for an interval.

The pulse repetition rate, or in other words the basic pacing rate, usually turns out to be about sixty-five or seventy pulses per minute for the patient with average values of heart impedance. The energy supplied to the heart is usually in the vicinity of forty to sixty-five microjoules per pulse and the sitmulating effective pulse duration is usually 2.0 milliseconds or slightly less. In the stimulator just described, the stimulating pulse has a wave form that is biphasic and declining exponentially.

The illustrative stimulator, and any stimulator with which the new analyzer is to be used, should be adapted for having its pulse repetition rate altered by means that operate exteriorly of the body. It is for this purpose that inductance L100 is included in the circuit. One may see that if pulses of proper polarity and amplitude are induced in L100, a positive, forward-biasing voltage may be caused to apear between the emitter and base of transistor Q102. If the external pulses are applied at a constant rate that is higher than the intrinsic rate of the implanted unit, the external device will take control over the basic or pacing pulse rate of the stimulator. Thus, the effect of the slightly higher rate external pulses is to cause capacitor C100 to be charged permaturely, that is, while it still has charge on it. This means that the charging pulse energy of the implanted unit will be reduced and the pulse rate will be increased slightly. When using the analyzer, the external pulsing device is set to step-up the basic pulsing rate preferably one pulse per minute.

Figure 3C:
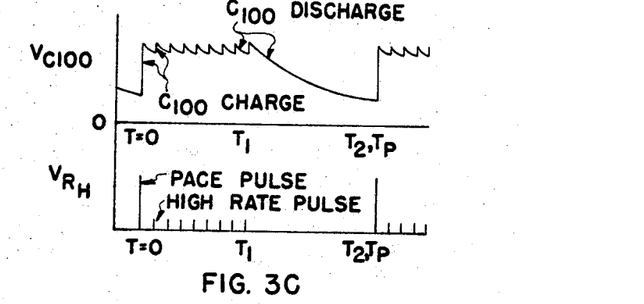
FIGURES 3C and 3D show charge and discharge cycles for each of the stimulators, respectively, during threshold analysis.

FIGURE 3C further illustrates the matter discussed in the preceding paragraph. Here one may see that upon occurrence of a pacing pulse at T equals zero, the voltage $V_{c100}$ on capacitor C100, rises abruptly at which time the organ is stimulated. The voltage drop across the organ resistance, $V_{Rh}$ also rises abruptly at T equals zero and it is the energy dissipated in this resistance that corresponds substantially with the pacing energy for the organ.

Immediately after the first pacing pulse at T equals zero, a series of high rate pulses are induced for a period $T_1$. The effect of the high rate pulses is to maintain the voltage $V_{c100}$ on capacitor C100, at its original level because each time C100 begins discharging, it is quickly recharged by the high rate pulses rendering Q102 conductive. Correspondingly high rate pulses appear across the organ resistance $R_h$ over the interval ending at $T_1$ but the voltage $V_{Rh}$ is so small that the high rate pulses do not stimulate the organ.

At $T_1$ the high rate pulses are discontinued and capacitor C100 is allowed to discharge between $T_1$ and $T_2$ whereupon another pacing pulse $T_p$ occurs at $T_2$. Since C100 is not allowed to discharge completely between pacing pulses, some voltage will exist on it when the next pacing pulse occurs. This means that the voltage drop $V_{Rh}$ across the organ is reduced below what it would have been if C100 were completely discharged, and hence, there is less energy for stimulation. By extending the interval during which the high rate pulses are induced, a point is reached when the pacing pulse at $T_p$ will have insufficient energy to stimulate the organ. This is synonymous with reaching threshold. If the high rate pulses are extended over the interval between T equals zero and $T_p$, the energy of the pacing pulse will equal that of a high rate pulse. In one embodiment of a cardiac stimulator, the energy value corresponding with a high rate pulse is about 1.5 microjoules, and the stimulator has an intrinsic pulse energy of about sixty microjoules. If thirty high rate pulses are induced, for instance, forty-five microjoules would be cancelled and fifteen microjoules would be available for stimulation. If these figures were also representative of threshold, the safety factor would be sixty divided by fifteen, or four. This means that there is four times as much energy available as is needed to exceed the threshold of the patient.

In some stimulators, means are provided for allowing the patient the choice between two or more basic rates. This is done by connecting a magnetically operable reed switch in series with a resistor, not shown, and paralleling this combination with resistor R101. By applying an external magnet, the patient may operate the reed switch and thereby change the time constant for discharging capacitor C100. With this model, if the low rate is set at sixty-five pulses per minute, a high rate of about eighty-five pulses per minute will usually be chosen. The patient may thereby operate his stimulator at a low rate during periods of comparatively low physical activity and at a higher rate while performing work or convalescing from an illness.

Those versed in the art of designing and using implantable cardiac stimulator will appreciate that other circuits may be adapted for external control of the pulse rate. For instance, some stimulator include a transistorized timing circuit that controls a switching transistor which is in series with the heart load and a large capactor that is shunted by a high resistance. The timing circuit then turns the switching transistor on and off at the desired pacing rate. It is easy to see that one may include an inductor equivalent to inductor L100 in the base circuit of one of the timing transistors to cause its timing period to expire prematurely, in which case the large capacitor in series with the heart load may be recharged fully at predetermined intervals occurring during the discharge period of the capacitor.

FIGURE 3B shows a schematic of another type of implantable stimulator with which the new analyzer may be used. This circuit is characterized by stimulating the organ during the discharge cycle of a capacitor, instead of during the charging cycle as previously described and by using a separate timing circuit for controlling the rate and amplitude of the charge.

Thus, in FIGURE 3B, a capacitor C200 is charged from a battery E200 between the times that pulses are applied to stimulate the organ load $C_h$ in series with $R_h$. When C200 is charged to a desired level, a semiconductor switch Q200 is closed and the capacitor C200 is discharged through the series circuit including R201, C201, $C_h$, $R_h$, and Q200. This quick discharge stimulates the organ. Then switch Q200 opens and capacitor C201 discharges slowly through R200 so that C201 can accept whatever charge is delivered to it from C200 when semiconductor switch Q200 is closed next. Required conditions are that, for this mode of operation, C201 must be much greater than C200, R200 must be much greater than $R_h$, and R202 must be much greater than $R_h$ plus R201.

Figure 3D:
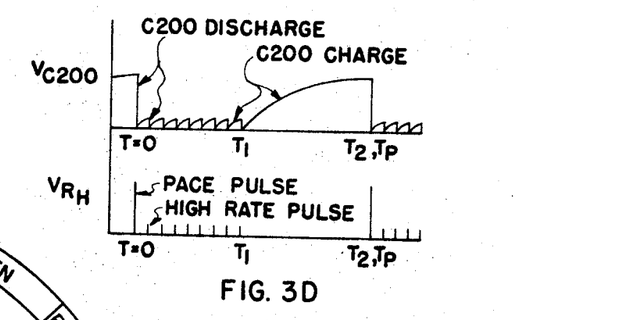

To trigger switch Q200 on, voltage is developed across L200 by the external source. The assumption is made that the induced signal is at a higher repetition rate than the basic, intrinsic pace rate of the implantable unit. The external signal is induced in L200 and this triggers Q200 on through its emitter circuit and R203. Q200 will remain on as a result of the voltage developed across R203, by voltage derived from the timing circuit, not shown. The timing circuit may be functionally the same as that in FIGURE 3A or any other timing circuit that provides the function may be used. As the high rate pulses come in, Q200 is repetitively rendered conductive so as to prevent C200 from charging to the level it would attain at its intrinsic rate. The high rate pulses are the small, repetitive pulses shown in FIGURE 3D. After a series of these pulses are terminated at time equals $T_1$, capacitor C200 is allowed to charge exponentially as shown through a fixed value of resistance R202. Because of the shortened charging time, C200 will now attain a lower voltage level and the same lower voltage will be used to stimulate the organ. This mode of operation is seen to be the converse of that described in connection with FIGURE 3A. The output stimulus $V_{Rh}$, however, is the same in FIGURES 3C and 3D.

Figure 7:
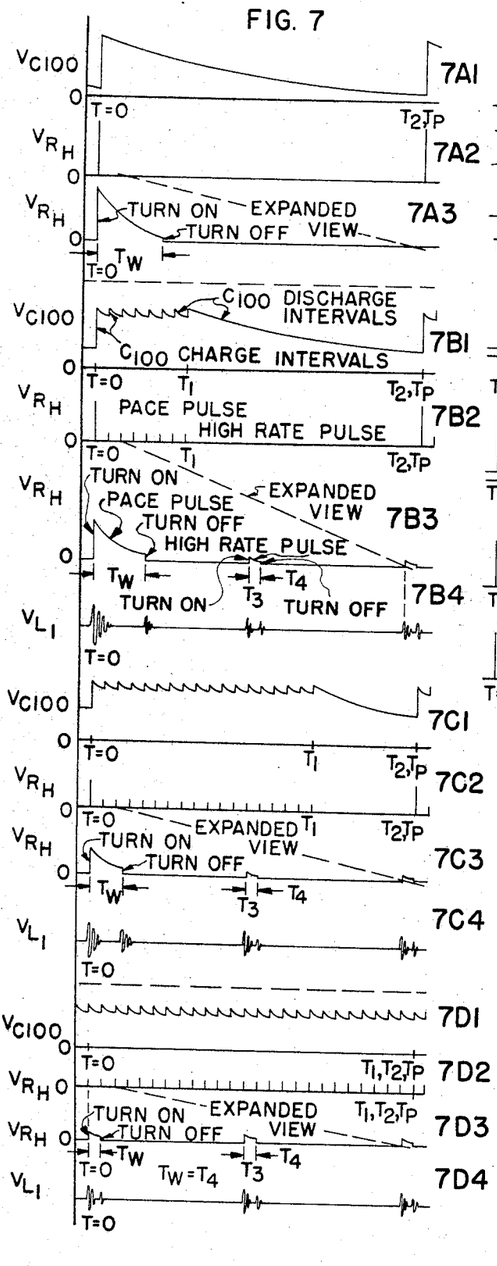
FIGURES 7–10 are graphs that are useful to explain the invention.

To avoid confusion, only wave form and other factors which are related to FIGURE 3A will now be discussed although what is said will be generally applicable. In FIGURE 7A1 the voltage developed across capacitor C100 during a charging pulse is represented by the total ordinate at T equals zero. The ordinate in FIGURE 7A2 at T equals zero is the voltage that appears across the organ resistance for stimulating. This sharp rise is expanded and enlarged in FIG. 7A3 to show that it persists for the time $T_w$. In FIGURES 7B1 and 7B2 the effect of inducing several small but high rate pulses may be seen. It is evident that the high rate pulses maintain the capacitor C100 near its fully charged condition over an interval of T equals zero to $T_1$ after which the capacitor C100 discharges to a voltage level over the period $T_1$ to $T_2$ but not quite to the low level in FIGURE 7A1 as noted by the offset from zero reference voltage in FIGURE 7B1. Then another major pacing pulse occurs at $T_P$ to charge capacitor C100. If the rate of the high rate pulses approaches infinity, C100 will be completely charged during the period $T_0$ to $T_1$. Practically, the high rate is a finite rate causing a slight discharge of C100 between pulses. It will be evident by comprising FIGURES 7A with 7B and 7C, that in the latter two cases the pulse energy associated with pacing is significantly lower and that the amount of energy reduction is related to the number of high rate pulses which are introduced. As stated earlier, in accordance with the invention, the number of high rate pulses may be extended until the current for charging capacitor C100 is insufficient for that energy dissipation in the heart which is needed to stimulate it. In FIGURE 7D it may be seen that as the high rate pulses are extended over the whole pacing period $T_p$, the pace pulse becomes the high rate pulse in both energy and pulse width. This is equivalent to saying that capacitor C100 is not allowed to discharge, and hence, the energy transferred to the heart is only the energy of the high rate pulse. This is insufficient to stimulate. Ordinarily, the threshold level of the patient would have been reached before the full train of pulses was applied. In FIGURES 7B2, 7C2, and 7D2 the voltage of the pace pulse and the high rate pulses delivered to the heart is exhibited. FIGURES 7B3, 7C3, and 7D3 show expanded versions of these pulses which are designated $T_w$ for the pace pulse and $T_4$ for the high rate pulses. The wave forms of 7B4, 7C4, and 7D4 show the detected electromagnetic signals outside the body and their time relationship to the stimulus signal. The detected signal will be discussed in greater detail elsewhere in the text.

Attention is now invited to FIGURE 4 in connection with which the stimulator locater and analyzer circuits will be described. The locater will be considered first. Its circuit comprises the lower half of FIGURE 4 and starts with a detection coil L1 which is inside and concentric with an external transmitting coil as may be seen in the cross-sectional view of the external coil assembly shown in FIG. 5. The detection coil may include a ferrite core 31 and comprise seven thousand turns of No. 38 wire, for example. When the external coil assembly is superposed on the surface of the patient's body over the implanted stimulator 11, signals generated by the implanted stimulator are induced in detection coil L1. The wave form of these signals is depicted in a series of wave forms shown in FIGURES 7B4, 7C4, and 7D4, where they are seen to constitute damped oscillations which have greatest magnitude when the stimulator turns on than when it turns off, or at any other time during the pace period $T_p$. The pace pulse turn-on amplitude is the signal used to locate the implanted stimulator. The detected signals are alternating and are coupled to the base of a transistor Q9 through a capacitor C6 which is in series with a resistor R25. When coil L1 is properly aligned with the internal stimulator coil such as L100 in FIGURE 3, a signal of about fifty millivolts is induced. Transistor Q9 is an emitter-follower stage. It is D-C biased by a voltage divider circuit including resistors R26 and R27. The bias point voltage is coupled to the base of Q9 by a diode CR7. The input signal to the base of Q9 is a damped A-C signal. The signal is not amplified in Q9 but is impedance-coupled to the emitter of Q9. The signal developed across an emitter-resistor R28 is coupled to a potentiometer P5 through a capacitor C7. P5 is a gain control that establishes the signal level at the base of another transistor Q10. The input signal to Q10 is A-C, and the D-C operating point or bias level of Q10 is established by a voltage divider circuit comprising R29, P5, and R53.

The input signal to transistor Q10 appears as an amplified signal on its collector. During the locating procedure, the three decks of switch SW1 are in the "locate" position. This means that the deck SW1A in the locater closes circuit with its A terminal. The signal on the collector of Q10 is an A-C signal that, of course, swings alternately positively and negatively around a certain bias point. When the collector is negative, a capacitor C8 charges with the indicated polarity, that is with its top electrode positive, as a result of it being connected directly to positive line. The charging path for capacitor C8 is through diode CR8 which is forward-biased and conductive when the collector of Q10 is negative.

One of the discharge paths for C8 is a resistor R33 in parallel with it. The other discharge path includes an emitter-resistor R37 which is in series with a Zener diode CR9 and the emitter of a transistor Q11. The base resistor R36 for Q11 is also in said other discharge path along with terminal A of switch deck SW1A. The voltage on capacitor C8 must reach a level that will break down the Zener diode CR9 before transistor Q11 will conduct. Q11 is operating in the emitter-follower mode.

The voltage developed across R37 is used to perform two functions. One is to provide a voltage that causes current to flow through meter 22 which is the same meter that appears in the top of the console shown in FIGURE 1. This meter in an actual embodiment has one milliampere meter movement and is calibrated to reflect the voltage on capacitor C8, and hence, the amount of coupling between detection coil L1 and the implanted stimulator 11. The resistor R38 is a calibrating resistor for the current meter. The scale of the meter with which we are concerned during the locating procedure, is the one that is marked red, yellow and green in FIGURE 6. It will be recalled that when the needle of this meter is deflected to a green zone, optimum coupling exists between the stimulator and detector or locater for proceding with threshold analysis.

Current will not flow through the Zener diode CR9 until there is adequate coupling between the detection coil and stimulator. Zener diode CR9 does not conduct until at least eight volts are impressed across it, which corresponds with a required eight volts appearing on capacitor C8. When it conducts, any voltage in excess of eight volts appears across R37 and this excess voltage forces current through meter 22 and causes it to deflect. The purpose of using the Zener diode is to require rather accurate location of the detection coil L1 before any meter deflection occurs. Initially, when the selector switch 21 was switched to the locate position, the meter deflected into the on zone indicating that the analyzer was in use. Resistor R49 provides the fixed bias voltage across R37 to deflect the meter in the on zone. After deflection is exhibited, it can be increased to a maximum, into the green zone, by further moving the detection coil on the body to obtain optimum coupling.

The other function that is effected by development of a voltage across R37 is to provide a biasing signal to an interlock circuit which is so designated in the drawing. The interlock circuit includes a transistor Q12 which is adapted to not conduct until meter 22 deflects in the green band. Thus, the bias signal of Q12 is conducted through several diodes CR14 which in combination are not rendered conductive until the bias signal has reached at least three volts at which time Q12 is biased into conduction. One Zener diode could be substituted for diodes CR14 when a higher bias voltage is required, before Q12 conducts.

As stated earlier, the bias voltage for the emitter-to-base circuit of Q12 is developed across resistor R37 which is positive at its top, and connected directly to the emitter of Q12 by way of the positive line, and is negative at its bottom and connected to the base of Q12 in a circuit that includes a limiting resistor R41 and the diodes CR14.

The interlock circuit includes a controlled rectifier SCR1 which will conduct if certain conditions are met. One of the conditions is that switch SW2 must be open in order to apply a positive bias at the gate of SCR1 through a diode CR12. The anode of diode CR12 is connected to an end of a resistor 42 which end is at ground potential when switch SW2 is closed. By the broken line 32 it is indicated that switch SW2 is mechanically coupled with some potentiometers in the analyzer circuit. It will appear later that when these potentiometers are turned counterclockwise to their minimum position, switch SW2 is compelled to open before a trigger voltage can be applied to SCR1 to release the interlock. This is a safety feature which assures that analyzer operation cannot be initiated at settings that existed at the end of the previous experiment.

Q12 will continue to conduct as long as their is adequate signal being picked up by the detection coil L1. If coupling of the coil is lost or any other failure occurs in the input end of the locater so as to remove bias from Q12, the latter will stop conducting and thereby remove potential from SCR1. When switch SW2 is open, the bias signal for SCR1 is provided through R42 and CR12. If voltage is lost on Q12 at this time, controlled rectifier SCR1 will go back to its nonconductive state and cannot be restored to conductivity until the coil L1 is properly located and switch SW2 is opened again by restoring control potentiometers to their minimum position. Whenever the potentiometers are at any thing but their minimum position, switch SW2 may close without effecting SCR1 since it is already in a conductive state if transistor Q12 has the proper voltage applied to it.

When SCR1 conducts, a green "ready" lamp LM1 goes on to indicate that conditions are correct for proceeding with threshold analysis. It should be observed at this juncture that there is a diode CR13 connected to the top of resistor R43. The cathode of CR13 is essentially connected to ground through R43 and the lamp when they are nonconducting, and hence, at this time, CR13 may be forward-biased and conducting. When SCR1 is gated into conduction, a voltage drop appears across resistor R43 which makes its top end positive, thereby reverse-biasing diode CR13. It will appear later that it is one of the features of the interlock to preclude proceeding with threshold analysis whenever CR13 is conductive.

The locater also uses meter 22 for testing the condition of its batteries 33 which in this circuit produce 25.2 volts when the batteries are new. To test batteries, selector 21 shown in FIGURE 1, is switched to the battery test position. Deck SWIC is switched to its position D. In this position, the battery conducts heavily because its main load is a low value resistor R40 which is connected between the positive terminal of the battery and ground. The object is to load the mercury-cell battery so that one may anticipate voltage drop-off, which is synonymous with battery failure. Switch deck SWIA is transferred to its position B when in the battery test mode. Because line 35 has become positiave as a result of it being connected to the top of resistor R40 through diode CR11 in the battery test mode, a bias potential is produced at a point intermediate a voltage divider comprising resistors R34 and R35. This bias potential is applied through R36 to the base of transistor Q11, thus rendering it conductive. The emitter-to-collector circuit of transistor Q11 may remain nonconductive, however, unless sufficient voltage is applied across Zener diode CR9 to permit conduction. If the batteries are not discharged below a certain level, the eight volts needed to break down the Zener diode will be exceeded and the excess voltage will again appear across resistor R37. The amount of excess voltage is indicative of battery condition.

If a difference voltage exists across R37, it will be applied to the meter through a path which includes part of positive line 35, the meter 22, and resistor R38. The variously colored scale of the meter is read in the battery test mode and if the needle is deflected in the yellow or green zones, battery condition is considered satisfactory. If needle deflection is in the low yellow or red zone, the batteries msut be replaced before proceeding with threshold experiment.

Power for the analyzer is supplied over a conductor 36 which is not energized unless switch deck SWIC is in its position B corresponding with the threshold analyzing mode selected by switch 21. Diode CR10 is in place for preventing current flow into the analyzer circuit by way of conductor 36 when the switches are in the locate position. The only voltage that is then being supplied is to the locater circuit. But when the analyzer is in the threshold position B for SWIC, the locater circuit has voltage applied through diode CR10.

It may be noted that a locater may also provide other useful functions. For instance, the detected input signal is amplified and appears at terminal 37. The amplified signals appearing here have the form shown in FIGURES 7B4, 7C4, and 7D4, and constitutes differentiated pulses which may be used to trigger a counter, oscilloscope, pulse width meter, or rate meter, none of which are shown.

Attention is now invited to the upper half of FIGURE 4 in connection with which the construction and operation details of the analyzer will be described. As stated earlier, threshold analysis is performed by means of an external transmitting coil L2 including a pacing pulse followed by a series of high rate pulses in an induction coil L100 that is incorporated in the implanted stimulator 11. The first in the series of pulses constitutes the pacing pulse and these pulses occur at a frequency that causes the stimulator to operate at about one pulse per minute above its intrinsic rate. The analyzer is adjustable, however, to any rate between sixty and one hundred and twenty pulses per minute. It is desirable that the overriding pacing pulse rate be just a little faster than the intrinsic stimulator pulse rate so that test conditions are as near as possible to conditions that exist when the patient is being paced normally.

Figure 8:
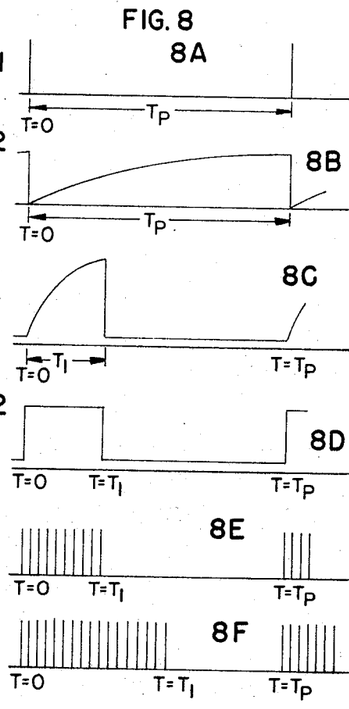

Initiation of the pacing pulses and the duration of the high rate pulse train is achieved by controlling a bistable multivibrator including transistors Q6 and Q5. Transistors Q6 is normaly conducting. When it receives an appropriate signal, it turns off and causes Q5 to become conductive. The off-time of Q6 corresponds with the high rate pulse interval. Thus, in FIGURES 8D and 8E one may see that at time T equals zero, Q6 would go on and that it would go off at time equals $T_1$. In FIGURE 8E, one may see that the high rate pulses occur over the same interval. The frequency of the first pulse in each series, corresponding with the pacing pulse rate, is adjustable over a range of sixty to one-hundred and twenty pulses per minute with the analyzer. The high rate pulses are preferably emitted at a rate of 2000 pulses per minute. It is desirable to have the rate of the high pulses as high as possible. In most cases the upper rate is determined by the turn-on and turn-off characteristics of the internal stimulator 11.

Figure 4:
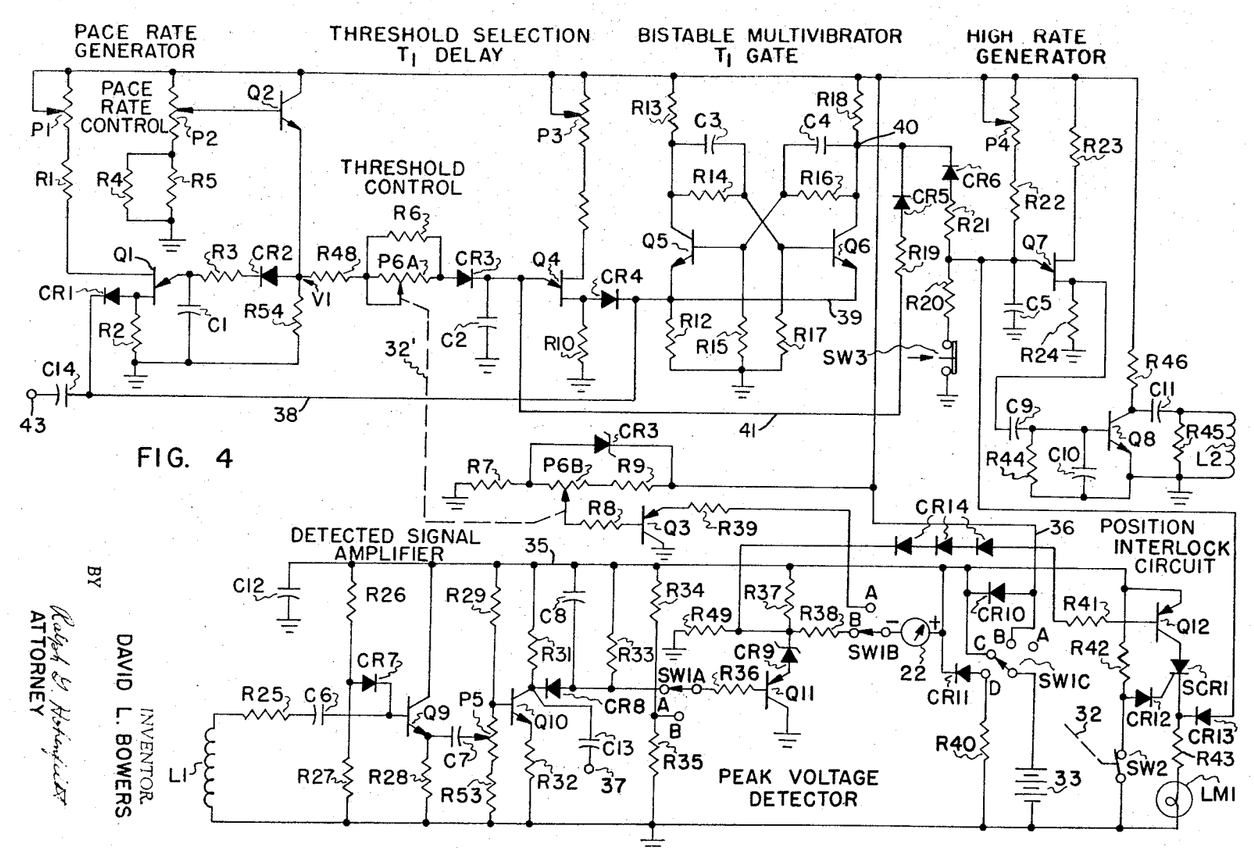
FIGURE 4 is a circuit diagram for the analyzer and an associated locater that enables determining the position of an implanted stimulator to facilitate its analysis.
Figure 5:
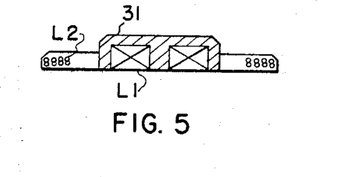
FIGURE 5 is a cross-section of a coil assembly that may be passed over the body surface of the patient for locating the pacemaker and for controlling its performance during analysis.

Refer now to the far left of FIGURE 4. Unijunction transistor Q1 is a pace rate generator that establishes the external pace rate of the analyzer. Its firing rate or time constant is dependent on a voltage at a junction point marked VI and the RC components R3 and C1. The voltage at V1 is controlled by a potentiometer P2 which in turn controls the conductivity of a transistor Q2. The firing point of unijunction transistor Q1 depends on the positive voltage that appears on capacitor C1. The charging rate of this capacitor depends in turn on the value of resistor R3 and the potential at V1. The upper rate of Q1 is controlled by varying potentiometer P1 which changes the intrinsic stand-off ratio of Q1. The lower rate is trimmed by adjustment of R4 in parallel with R5 which in turn controls the current through P2 and thereby adjusts the potential applied to the base of Q2. The voltage at V1 is essentially the same as the voltage on the base of transistor Q2, but the latter provides isolation between the circuit to which the voltage is applied and the pace rate adjustment control P2. R54 is used for applying load to Q2 so that transistor will operate in its stable range.

The charging condition of capacitor C1, and correspondingly, the voltage that appears on the emitter of Q1 is typified in FIGURE 8B where it may be seen that the charging interval corresponds with $T_p$ which is the pacing pulse rate that governs the implanted stimulator. FIGURE 8A demonstrates that these pacing pulses recur whenever the capacitor C1 has a voltage on it that is sufficient to fire unijunction Q1.

Q1 generates positive pulses at the top of a resistor R2 and these pulses are transmitted through diode CR1 over a conductor 38 to the common emitter line 39 of the bistable multivibrator transistors Q6 and Q5. Assume that Q6 is normally in its on state. Its collector is then at essentially the same potential as its emitter in which case no bias is applied to the base of Q5 and the latter remains nonconductive. When a positive pulse is received from unijunction transistor Q1, it appears as a positive pulse across emitter resistance R12. R12 is common to both Q5 and Q6. When R12 becomes positive at its top end, the emitter which is associated with the conductive transistor is reverse-biased and switched into its off state. Thus, positive pulses switch Q6 off and Q5 on. When Q6 goes off, its collector rises to essentially positive line potential and this applies a positive bias on the base of Q5 at the mid-point of the voltage divider comprising R16 and R15. Thus, it is seen that receipt by the multivibrator of positive pulses from transistor Q1 constitutes initiation of a timing period which corresponds with T equals zero in FIGURE 8D. It should be noted that when Q6 is nonconductive, its collector rises to a positive potential of the same value that exists at the bottom end of resisor R18. For future convenience, this point is designated by the reference numeral 40.

Attention will now be given to the manner of terminating the timing period at time $T_1$ as indicated in FIGURE 8D. This involves unijunction transistor Q4. In this circuit the intrinsic stand-off ratios of transistors Q4 and Q1 must be made equal. Moreover, as the pacing pulse period $T_p$ is varied, the time period $T_1$ must be varied proportionally regardless of whether the pace pulse period is made longer or shorter.

Capacitors C1, associated with Q1, and C2, associated with Q4, must also be matched to assure the proper timing of the two circuits. The object is to match the timing characteristics of the two transistors by matching the resistances that are in series with each of their capacitors and that are supplied from a common voltage point V1. This in effect means matching resistor R3 with the combination of series resistor R48 and parallel resistors P6A and R6 with potentiometer P6A turned clockwise so that it has maximum resistance. Unijunction transistors Q1 and Q4 must have the same intrinsic stand-off ratios if proportionality is to be maintained over the pace rate range of sixty to one hundred and twenty pulses per minute. Potentiometer P3 is used to match Q1 and Q4 intrinsic stand-off ratios.

The charging path for capacitor C2 is from point V1 through R48 and potentiometer 6A in parallel with trimmer resistor R6, and then through diode CR3 to the capacitor C2. When transistor Q6 in the bistable multivibrator is conducting, capacitor C2 cannot charge because it is effectively connected to ground through a line 41 which includes a diode CR5, R19 and R12. As was explained earlier, conduction of Q6 puts point 40 at essentially ground potential.

At the start of the timing period, when Q6 stops conducting, capacitor C2 begins to charge through CR3, the parallel combination of P6A, R6 and R48. The capacitor tends to charge to a voltage value equal to that at point V1. When C2 reaches a voltage equal to the intrinsic stand-off ratio of unijunction transistor Q4, the latter fires and applies a positive pulse to the emitter of Q4. This pulse appears at the top of resistor R10 and is transmitted to diode CR4 and appears on resistor R12 which is the common emitter resistor for the multivibrator Q5 and Q6. The multivibrator then switches in the reverse state which is for Q6 to switch into conduction again and for Q5 to switch out of conduction. This is the state that the multivibrator was in prior to receiving a pulse from unijunction transistor Q1. The charging curve for capacitor C2 is shown in FIG. 8C and it is seen to start at the same time that a pacing pulse is initiated and to terminate at the end of a period $T_1$ when unijunction Q4 fires. It is now possible to see that if the potential at point V1 is raised, the basic pacing pulse rate of Q1 will be shortened and that the timing period for Q4 will be correspondingly shortened in which case proportionality between the timing and pacing pulses will be maintained. The converse is true if the voltage at V1 is lowered. It will be shown that the on-time of the multivibrator, that is, the on-time of Q5 and concurrent off-time of Q6, coincides with the interval during which the high rate pulses may be applied.

Figure 9:
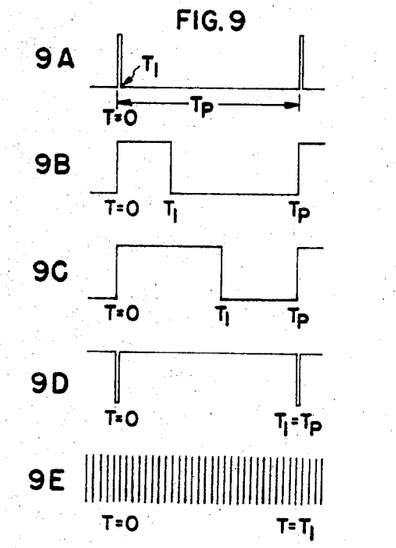

The high rate pulse interval from T equals zero to $T_1$, and hence, the number of pulses following a pacing pulse may be varied with threshold control potentiometer P6A. As long as V1 is held constant, the basic pacing pulse rate will remain constant. In fact, the timing period $T_1$ or, in other words, the high rate pulse interval may be varied from a short interval until it is substantially coextensive with the pacing pulse period $T_p$ as can be seen by comparing FIGURES 9B, 9C, and 9D in which examples $T_p$ is held constant.

If the basic pacing pulse period $T_p$ is changed by adjusting potentiometer P2 to change V1 there will be a proportional change in the timing interval $T_1$ so that the ratio of $T_1$ to $T_p$ will remain constant for a given setting of P6A. For example, the ratio of $T_1$ to $T_p$ in FIGURE 8D for a given time of $T_p$ in FIGURE 8A is the same as the ratio of $T_1$ to $T_p$ in FIGURE 9B for a different value of $T_p$ in FIG. 9A. An advantage of the independent adjustments discussed in this and the preceding paragraph is that threshold energy may be read as a percent of available pacing pulse energy on a single scale of the meter 22.

The high rate pulses which are induced in the implanted stimulator during threshold analysis is a rapidly successive series following each pacing pulse are produced in the high rate generator which involves unijunction transistor Q7. Associated with transistor Q7 is its timing capacitor C5. Q7 will not conduct until the potential applied to its emitter from capacitor C5 exceeds the intrinsic stand-off ratio voltage of the transistor. The normal charging path for C5 is through a high rate control potentiometer P4 and resistor 22. P4, R22, R21 and diode CR6 are serially connected and the last-named has its cathode connected to point 40, or the collector of Q6. As a result of this arrangement, when Q6 is conducting and point 40 is essentially at ground potential, diode CR6 is forward-biased, and insufficient potential can build up on capacitor C5 to fire unijunction Q7. When point 40 goes positive as it does coincidentally with occurrence of a pacing pulse, diode CR6 is reverse-biased, and for all practical purposes disconnected, in which case the potential on capacitor C5 may rise to a value corresponding with the firing point of unijunction transistor Q7 provided other conditions are met.

An additional necessary condition for generation of high rate pulses is that the operator must press and open normally-closed operator switch SW3 to disconnect the positive terminal of capacitor C5 from its ground path through resistor R20 and SW3. Switch SW3 is self-returning to closed position so that C5 cannot charge and high rate pulses cannot be induced in the stimulator unless the analyzer is attended by an operator.

Another required condition for firing transistor Q7 and the production of high rate pulses is that diode CR13 in the position interlock circuit discussed earlier be reverse-biased so that capacitor C5 may charge. It will be recalled that the interlock circuit protects the patient against the threshold analyzer being improperly placed over the stimulator and against the threshold control adjustment potentiometer P6A not being returned to its minimum position. It should also be recalled that when all conditions are correct for conducting a threshold test, SCR1 becomes conductive and causes a positive voltage to appear at the junction of R43 and the cathode of CR13. This positive potential reverse-biases the diode CR13 and enables charging of capacitor C5 so that high rate pulses may be produced as described above.

The high rate pulses are coupled to the base of a transistor Q8 through a capacitor C9. This should be a nonpolarized capacitor. Resistor R44 is provided as a discharge path for capacitor C9 which path includes resistor 24 connected to one of the terminals of Q7.

Figure 10:
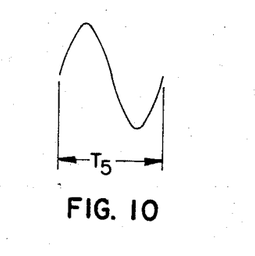

When Q7 transfers a high rate pulse to capacitor C9, part of the voltage appears across capacitor C10, placing Q8 into conduction. Prior to this, capacitor C11, which is connected to the collector of Q8, has been charged essentially to battery voltage on a long time constant through resistor R46. When Q8 conducts, the charge on C11 flows through Q8 and L2, the external transmitting coil. Current flow through L2 produces an electromagnetic field which is coupled to the coil L100 in the implanted stimulator. Upon termination of the first conduction cycle, the magnetic field of L2 collapses and causes a voltage to be induced which is opposite of the original voltage across the transistor Q8 when conduction began. The path of current accompanying generation of this voltage includes the interelectrode capacitance between the emitter and collector of Q8 and the capacitor C11 in series with it. R45 is a damping resistor that reduces the oscillation to one complete sine wave. This sine wave is designated $T_5$ in FIG. 10 where it is shown expanded for the sake of clarity since it has only a five microsecond period. The advantage of the sine wave is that the output coil L2 can be placed on the patient's body without regard for polarity.

Figure 2:
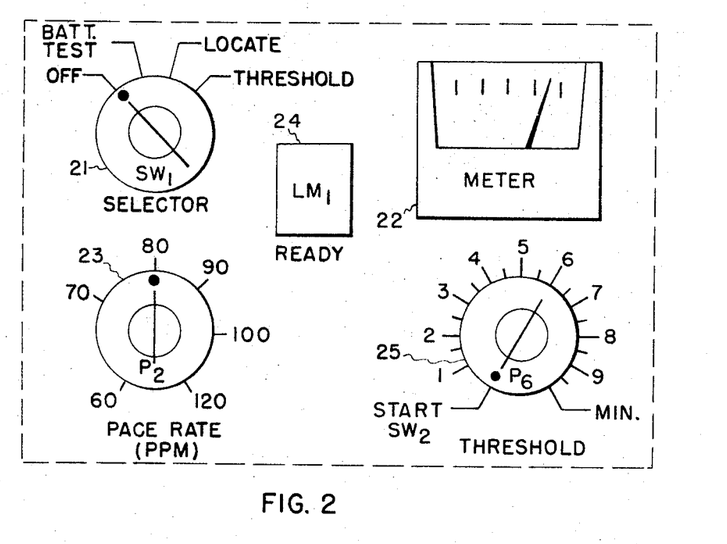
FIGURE 2 is a schematic plan view of the various switches, indicator lights, control knobs and meter which are located on top of the analyzer.

It will be recalled that the first pulse in a series of pulses constitutes the overriding basic pacing pulse for the implanted stimulator and that this is controlled by the pace rate control potentiometer P2 and more particularly by the knob 23 of that potentiometer which appears in FIGURE 2 and is calibrated to permit a basic rate variation of from sixty to one hundred and twenty pulse per minute. The time between the first pacing and next ensuing high rate pulses is approximately 30 milliseconds when the high rate generator is set by means of potentiometer P4 at a 2000-pulse per minute rate. Each of the high rate pulses, including the first pulse which is the pacing pulse, produces the five microsecond sinusoidal output pulse across L2 discussed above.

Although the meter 22 has a scale that is calibrated in terms of percent of available energy at threshold, the current through the meter is not the same as that through threshold control potentiometer P6A but is proportional to it by virtue of using potentiometer P6B which is ganged with P6A as symbolized by the broken line 32'. When switch SW1B shown next to the meter is switched to its position A for the threshold mode, positive line 36 potential is placed across a resistor R9 which is in series with the resistance of potentiometer P6B. A Zener diode CR3 bridges these resistors in order to maintain a constant voltage across R9 and P6B and eliminate batttery voltage fluctuations. R7 provides a path for current that flows through diode CR3 when its Zener voltage is exceeded by the applied voltage so that the total voltage across series connected P6B and R9 will not exceed the Zener voltage. The potential developed across the wiper of P6B and the positive line 36 is applied to the base of a transistor Q3. Q3 is an emitter-follower device that provides isolation between the voltage selector P6B and the meter 22. R39, in series with the emitter of Q3, acts as an emitter-limiting and calibration resistor for meter 22. The current through the meter corresponds with different voltages that appear between the wiper of potentiometer P6B and positive line. Thus, the meter reading corresponds with threshold control setting. This is equivalent to saying that the meter 22 corresponds with the time period $T_1$ or the time during which high rate pulses are generated and induced. The time is also proportional to energy at threshold.

An incidental feature of the analyzer is that it is provided with a terminal 43 on which a voltage appears in coincidence with receipt of pacing pulses through capacitor C14. This terminal may be used, for example, to trigger an oscilloscope or other device, in connection with conducting certain stimulator experiments.

To recapitulate use of the device, reference is made to FIGURE 2. First a selector switch 21 controlling the various decks of switch SW1 is turned to battery test position. If batteries are low, replace before proceeding with experiment. Next turn selector switch 21 to locate position. The external coil assembly is then moved about the surface of the patient's body in the vicinity of the stimulator power supply implant which is usually in the abdominal area or in the axillary region. When adequate electromagnetic coupling is made with the stimulator, "ready" lamp LM1 will go on. Note, the "ready" lamp will only go on when the threshold control 25 is in the starter minimum position. The degree of error in placement can be determined continuously by viewing the meter and seeing to it that the needle points to the green band. With a proper meter reading and with the "ready" light on, the selector switch may be transferred to the threshold position.

Ordinarily, the operator will have determined the basic or intrinsic pacing rate of the implanted stimulator through the agency of an electrocardiograph before the stimulator is located. At this time, the pace rate control knob in FIGURE 2 is set to a rate that is slightly in excess of the intrinsic stimulator rate. This assures that the analyzer will dominate the implanted stimulator. The induced pace rate is preferably set at one pulse per minute in excess of the intrinsic rate.

Before any threshold measurement may be started, and before the "ready" light will go on, it is necessary to run the threshold adjustment knob, which means adjusting potentiometer P6 to its zero position in which case start switch SW2 in the interlock circuit will be opened so as to permit completion of a circuit through the "ready" light. After the threshold control knob is advanced in a clockwise direction to induce more and more high rate pulses along with each pace pulse, the start switch SW2 will remain closed, which is immaterial because once SCR1 has begun conducting in the interlock circuit, grounding of its gate electrode will have no effect.

As the threshold control knob is turned clockwise gradually, a sufficient number of high rate pulses will be induced in the stimulator to drop the energy per pacing pulse to a level which is below the minimum energy required to stimulate the organ. This may be determined by observing missed beats of the heart on a cardiac monitor such as an oscilloscope display of the cardiac wave. Of course, a precondition for inducing high rate pulses is that operator switch SW3 be pressed open. This switch is located on the external coil assembly for the convenience of letting it return to its closed position by the operator merely relieving pressure from it. The pressure required to deflect the operator switch SW3 will also provide better coupling between coil assembly and implanted stimulator. Thus, it is easy to terminate the threshold test contemporaneously with observation of stopping of the heart for one beat but no more than three beats if a cardiac stimulator is involved.

The threshold analyzer is ordinarily not used on patient's immediately after stimulator implantation because the patient's threshold is then usually low in which case the small high rate pulses that are used to charge capacitor C100 in the stimulator during its normal discharge period may be energetic enough to stimulate the heart.

Ten percent of available energy at threshold is the lowest value that can be read on the scale of the meter. Anything below this value would indicate an unusually low threshold. To emphasize this point, when the meter needle is indicating below ten, it points to a short red zone on the colored band above the scale just mentioned to suggest that threshold analysis should be discontinued.

When meter 22 is completely de-energized, its needle will deflect to the far left position beyond the scale point that is marked with a graduation 100. This is done so that the meter will not be on-scale unless the threshold or locating procedure is in progress.

Referring back to FIGURE 8E or 8F, one may see that a fixed number of high rate pulses of predetermined energy may be caused to occur between pacing pulses. For example, if the basic pace rate is eighty pulses per minute, these pulses will be spaced by 750 milliseconds. If the duration of the short rate pulses is thirty milliseconds at 2000 pulses per minute, twenty-five high rate pulses will occur per pacing cycle. If ten high rate pulses are induced during the interval $T_1$, this means that fifteen more could be induced but are not during the off time when capacitor C100 in the stimulator is discharging. If the ten pulses correspond with reaching threshold, then the percentage of available energy from the stimulator required at threshold is $$\frac{15}{25} \times 100$$

which equals 60 percent. The meter is calibrated to read this percentage directly and as described above, this is inversely related to the on-time interval $T_1$.

The threshold analysis procedure described above has several important medical uses in connection with studying implanted stimulators. For instance, it is now possible for the cardiologist to observe threshold changes: that accompany administration of drugs which have an effect on threshold; that accompany various heart rate and activity levels of the patient; and, that are related to different surgical techniques, electrode placement and electrode materials. It is also possible now to determine the minimum energy required to stimulate a particular patient's heart or other organs so that stimulators may be designed for minimum power consumption and corresponding extension of battery life.

Other embodiments of the analyzer, not shown, are adapted to permit reduction of the basic pulse rate as well as its increase. This is done by injecting a series of high rate pulses holding the capacitor C100 in the stimulator in its charged state and then letting the capacitor discharge completely before another pacing pulse is induced.

Although a preferred embodiment of the invention has been described in considerable detail, such description is intended to be illustrative rather than limiting, for the concepts herein taught for determining threshold, may be applied to various stimulators with various electronic circuitry by those who are knowledgeable in this art. Accordingly, the true purpose and scope of the invention is to be determined only by construing the claims which follow.

It is claimed:

1. An external analyzer for determining from outside of the body the percent of energy available from an implanted stimulator that is required to stimulate the heart, which stimulator has a power supply and a capacitor coupling it to the heart, and a switch normally cycling the capacitor at a basic pulse rate and charge level, and wherein there are induction responsive means for operating the switch at higher than the basic rate, said external analyzer comprising:

(a) an external induction means adapted for being placed on the body near the stimulator for electromagnetic coupling with the induction responsive means, (b) a high rate pulse generator connected to the external induction means, (c) a switching device having two stable states and being adapted to turn the high rate pulse generator on when in one state and off when in the other state, (d) an adjustable voltage source, (e) a pacing pulse generator supplied from said voltage source and having a pulse repetition rate dependent on the adjustment of the voltage, said pacing pulse generator being connected to said switching device for switching it into one of its states and initiating a series of high rate pulses and also effecting stimulation of the heart upon occurrence of the first pulse, which is the pacing pulse, by cycling said capacitor through the switch in the stimulator, (f) a timing pulse generator also supplied from said adjustable voltage source and being connected to said switching device for switching it to its other stable state and thereby terminating said high rate pulses in response to occurrence of a pulse from the timing pulse generator, adjustment of said adjustable voltage source maintaining the ratio of the time between a pacing pulse and a timing pulse to the total time between consecutive pacing pulses, (g) a potentiometer means interposed between said adjustable voltage source and said timing pulse generator for controlling independently the time between a pacing pulse and a pulse from the timing pulse generator and accordingly controlling the number of high rate pulses that follow each pacing pulse during threshold analysis, (h) the setting of said potentiometer means corresponding with the ratio between the number or time of the high rate pulses and the maximum number of high rate pulses that could occur between pacing pulses for a set pacing pulse rate, (i) the said high rate pulses also operating said switch in the stimulator to maintain the charge on the stimulator capacitor for the duration of the high rate pulses so that the capacitor discharges to a certain lesser level between pacing pulses and ensuing pacing pulses may add less charge and energy to the capacitor for stimulating the heart, whereupon the high rate pulses may be increased until threshold is reached.

2. The analyzer set forth in claim 1 wherein:
  (a) the pacing pulse generator comprises a semiconductor device that produces a pacing pulse output signal when a voltage of predetermined value is applied to the device,
  (b) a first capacitor and a first resistor in series therewith, the said capacitor being connected to the device for developing the voltage of predetermined value at a time that depends on the valve of the resistor, and an applied voltage,
  (c) said timing pulse generator comprising a semiconductor device that produces an output signal that terminates the time interval following the pacing pulse when a voltage of predetermined value is applied to it,
  (d) a second capacitor and a second resistor in series therewith,
  (e) the said first and second resistors each having one of their respective ends connected to the adjustable direct voltage source, whereupon variation of said direct voltage to vary the time between output signals from said pacing pulse generator will cause a proportional variation in the time interval of said timing pulse generator.

3. The invention set forth in claim 2 wherein:
  (a) said switching device includes a bistable gate circuit connected with and adapted to receive signals from both the timing pulse generator and the pacing pulse generator,
  (b) said gate circuit having a terminal on which a voltage of one value appears when the gate circuit is in a first state and on which another voltage appears when the gate circuit is in a second state,
  (c) the said second capacitor having one side connected to said terminal to preclude said second capacitor from charging when the first voltage appears on the terminal and to permit said second capacitor to charge when the second voltage appears on the terminal,
  (d) said gate circuit being adapted to change from its first to its second state upon receipt of a signal from said pacing pulse generator, whereby to initiate said timing period, and to return to its first state upon receipt of a signal from said timing pulse generator whereby to terminate said timing interval, and
  (e) said high rate pulse generator being connected to said terminal and being adapted to turn on and off in response to the voltages that appear on the terminal.

4. The invention set forth in claim 3 wherein:
  (a) the aforesaid high rate pulse generator includes a semiconductor device that produces output pulses in correspondence with a voltage of predetermined value being applied to the device,
  (b) a power source, a third resistor and third capacitor in series between said power source and connected at their intermediate point to the semiconductor device for the voltage on the capacitor to control the device,
  (c) a diode connected between said bistable circuit terminal and said intermediate point,
  (d) the said diode preventing the third capacitor from charging when the bistable circuit is in its first state and permitting the third capacitor to charge when said bistable circuit is in its second state thereby allowing said semiconductor device to produce high rate pulses during the aforesaid timing interval under certain conditions.

5. The invention set forth in claim 4 including:
  (a) a manually operable switch connected to said intermediate point and the third capacitor to discharge the same until said switch is operated to cause high rate pulses to be applied to the electromagnetically responsive means in the stimulator.

6. The invention set forth in claim 4 including:
  (a) a transistor means including a collector, a base and an emitter,
  (b) a coupling capacitor connected with the last-mentioned semiconductor device and the base of the transistor for transmitting high rate pulses thereto,
  (c) a capacitor connected in a series circuit with the aforesaid induction means across the collector and emitter of the transistor, and
  (d) a resistor shunted across the induction means,
  (e) the elements connected in circuit with the collector and emitter being adapted to oscillate upon receipt of each high rate pulse so that voltages of opposite polarities are developed in the induction means, whereby to enable electromagnetic control of the stimulator regardless of which direction the magnetic field enters the body.

7. The invention set forth in claim 1 including:
  (a) a second potentiometer means that is coupled with the first potentiometer means for coordinate adjustment therewith,
  (b) another source of direct voltage,
  (c) an electric meter connected in circuit with the second potentiometer means and the direct voltage source,
  (d) said meter being adapted to deflect in correspondence with the setting of said first potentiometer means to thereby indicate the proportionality between the timing interval and the pace pulse interval and hence indicate directly the energy used from the stimulator at threshold as a percentage of available energy from the stimulator.

8. A locator for a stimulator of the type that is adapted to deliver electric stimuli to an organ in a body and that radiates electromagnetically in correspondence with occurrence of the stimuli, said locator comprising:
  (a) an electromagnetic detector means that is adapted to be moved over the surface of a body to effect optimum magnetic coupling with a stimulator,
  (b) a peak voltage detector means whose input is connected to receive signals from said electromagnetic detector,
  (c) a D-C power line,
  (d) a capacitor having one terminal connected to the D-C power line and another terminal connected to receive the output current from the peak detector and to develop a corresponding voltage on the capacitor,
  (e) a sensing circuit connected to said other capacitor terminal and including a transistor, a Zener diode and a resistor in series, the latter of which is connected to the power line,
  (f) a meter having one terminal connected to a point intermediate the Zener diode and the resistor and another terminal connected to the power line, whereby when the voltage on the capacitor is great enough to break down the Zener diode a voltage is developed across the resistor which diverts current through the meter to indicate proportionally to conduction and to the degree of coupling between the electromagnetic detector means and the stimulator,
  (g) a transistor having a base, a collector and an emitter,
  (h) the base-emitter circuit of the transistor being connected across said resistor whereby to render the collector-emitter circuit of the transistor conductive according to the bias voltage supplied from the resistor, (i) a controlled rectifier having an anode and a cathode in series with the collector-emitter circuit of the transistor and said controlled rectifier also having a gate electrode, conduction of the controlled rectifier being dependent in one respect on the bias on the transistor, (j) a switch in circuit with the gate electrode and having two states for selectively controlling conduction by the controlled rectifier, closure of said switch causing said gate electrode to be by-passed to render said controlled rectifier nonconductive, (k) a stimulator analyzer control device that is mechanically coupled with the switch so that the device must be in a predetermined state before the switch can be transferred to a state which initiates conduction of the controlled rectifier, (l) the cathode of said controlled rectifier constituting a terminal on which two voltage states occur, (m) a stimulator threshold analyzer connected to said last-named terminal and adapted to being operable or inoperable in response to which of the said two voltage states occur on said terminal, depending on the bias voltage on the transistor from the resistor and on the state of the resetting switch.

9. The combination of an analyzer for monitoring operation of an isolated electric stimulator for a body organ and a locater for finding the stimulator when it is concealed from view:

(a) said analyzer comprising means for variably inducing energy electromagnetically into a stimulator to gain control over its pacing rate and to diminish the energy of the stimuli from the stimulator until it ceases to stimulate the organ, (b) a variable pulse generator in said analyzer, (c) an induction means operated by pulses from the generator to transmit corresponding electromagnetic pulses to a stimulator, (d) a control circuit adapted for controlling production of electric pulses from said generator, said control circuit including an interlock terminal that has two states, one of which permits production of pulses and the other of which prohibits the same, (e) said locater comprising an electromagnetic detector means for sensing magnetic effects of the stimulator and producing a signal corresponding with the magnetic coupling with a stimulator, (f) an interlock circuit adapted to receive the last-named signal and to assume one state for a signal below a predetermined value and another state for a signal above a predetermined value, the said interlock circuit being connected with the said interlock terminal so that it must be in a predetermined state to permit transmission of electromagnetic pulses.

References Cited

UNITED STATES PATENTS

| | | | |
|---|---|---|---|
| 2,823,678 | 2/1958 | Luftman et al. | 128—422 |
| 2,997,651 | 8/1961 | Richeson et al. | 324—103 |
| 3,127,895 | 4/1964 | Kendall et al. | 128—422 |
| 3,195,540 | 7/1965 | Waller | 128—422 |

OTHER REFERENCES

Eisenberg et al., "I.R.E. Transactions on Medical Electronics," vol. BME-8, No. 4, October 1961, pp. 253–257 (copy in 128–419P).

Kantrowitz et al., "Surgery, Gynecology and Obstetrics," October 1962, pp. 415–420 (copy in 128–419P).

WILLIAM E. KAMM, *Primary Examiner.*

U.S. Cl. X.R.

324—47, 103; 331—111; 340—282